(12) United States Patent
Wang et al.

(10) Patent No.: US 11,714,513 B2
(45) Date of Patent: Aug. 1, 2023

(54) ARRAY SUBSTRATE AND MANUFACTURING METHOD THEREOF AND TOUCH DISPLAY PANEL

(71) Applicants: Wuhan BOE Optoelectronics Technology Co., Ltd., Hubei (CN); BOE Technology Group Co., Ltd., Beijing (CN)

(72) Inventors: Chao Wang, Beijing (CN); Ning Zhu, Beijing (CN); Yujie Gao, Beijing (CN)

(73) Assignees: Wuhan BOE Optoelectronics Technology Co., Ltd., Hubei (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/427,072

(22) PCT Filed: Jan. 6, 2021

(86) PCT No.: PCT/CN2021/070472
§ 371 (c)(1),
(2) Date: Jul. 29, 2021

(87) PCT Pub. No.: WO2021/147674
PCT Pub. Date: Jul. 29, 2021

(65) Prior Publication Data
US 2022/0100318 A1    Mar. 31, 2022

(30) Foreign Application Priority Data

Jan. 21, 2020  (CN) .......................... 202010070583.0

(51) Int. Cl.
*G06F 3/044* (2006.01)
*G02F 1/1362* (2006.01)
(Continued)

(52) U.S. Cl.
CPC .......... *G06F 3/0446* (2019.05); *G02F 1/1368* (2013.01); *G02F 1/136286* (2013.01); *G06F 3/0412* (2013.01)

(58) Field of Classification Search
CPC ................. G06F 3/0446; G06F 3/0412; G06F 2203/04103; G06F 3/04164; G06F 3/0443;
(Continued)

(56) References Cited

U.S. PATENT DOCUMENTS

2011/0128490 A1* 6/2011 Park ................... H01L 27/3258
                                                        438/30
2015/0370114 A1* 12/2015 Du ...................... G02F 1/13439
                                                        349/12

(Continued)

FOREIGN PATENT DOCUMENTS

CN        103560110 A    2/2014
CN        104571715 A    4/2015
(Continued)

OTHER PUBLICATIONS

CN202010070583.0 first office action.
CN202010070583.0 second office action.
PCT/CN2021/070472 international search report.

*Primary Examiner* — Amit Chatly
(74) *Attorney, Agent, or Firm* — IPro, PLLC (57) ABSTRACT

An array substrate includes: a plurality of touch units arranged in an array and insulated from each other; each of the plurality of touch units including at least one electrode block arranged in an array and connected to each other; and a plurality of touch lines; wherein the touch units and the touch lines are connected in a one-to-one correspondence by direct overlap. Also disclosed are a touch display panel and a method for manufacturing the array substrate.

14 Claims, 11 Drawing Sheets

(51) Int. Cl.
*G02F 1/1368* (2006.01)
*G06F 3/041* (2006.01)

(58) Field of Classification Search
CPC ............. G02F 1/136286; G02F 1/1368; G02F 1/13338
See application file for complete search history.

(56) References Cited

U.S. PATENT DOCUMENTS

| | | | |
|---|---|---|---|
| 2016/0027820 A1* | 1/2016 | Liu | ............... H01L 29/24 257/43 |
| 2016/0041665 A1* | 2/2016 | Gwon | ................ G06F 3/0412 345/174 |
| 2016/0187693 A1 | 6/2016 | Woo et al. | |
| 2016/0357314 A1 | 12/2016 | Liu et al. | |
| 2018/0299984 A1 | 10/2018 | Zang et al. | |
| 2018/0341354 A1 | 11/2018 | Guo et al. | |
| 2019/0129538 A1* | 5/2019 | Yoshida | ................ G06F 3/0412 |
| 2020/0057520 A1* | 2/2020 | Hung | .................... G06F 3/0412 |
| 2020/0159350 A1* | 5/2020 | Yang | ....................... G06F 3/044 |

FOREIGN PATENT DOCUMENTS

| | | |
|---|---|---|
| CN | 105373272 A | 3/2016 |
| CN | 205302237 U | 6/2016 |
| CN | 105739203 A | 7/2016 |
| CN | 106324924 A | 1/2017 |
| CN | 106383413 A | 2/2017 |
| CN | 107193417 A | 9/2017 |
| CN | 109582179 A | 4/2019 |
| CN | 111290658 A | 6/2020 |
| EP | 3905012 A1 | 11/2021 |
| KR | 20190080563 A | 7/2019 |

* cited by examiner

ARRAY SUBSTRATE AND MANUFACTURING METHOD THEREOF AND TOUCH DISPLAY PANEL

CROSS REFERENCE TO RELATED APPLICATIONS

The present application is a U.S. National Phase of International Application No. PCT/CN2021/070472, entitled "ARRAY SUBSTRATE AND MANUFACTURING METHOD THEREOF AND TOUCH DISPLAY PANEL", and filed on Jan. 6, 2021. International Application No. PCT/CN2021/070472 claims priority to Chinese Patent Application No. 2020100705830 entitled "ARRAY SUBSTRATE AND MANUFACTURING METHOD THEREOF AND TOUCH DISPLAY PANEL" filed on Jan. 21, 2020. The entire contents of each of the above-listed applications are hereby incorporated by reference for all purposes.

TECHNICAL FIELD

Embodiments of the present disclosure relate to an array substrate, a manufacturing method thereof, and a touch display panel.

BACKGROUND

In related art, touch screen panels can be divided into: Add on Mode Touch Panels, On Cell Touch Panels, and In Cell Touch Panels according to the structures. The first two types have thicker touch screens due to their laminated structure. On the other hand, in a Touch and Display Driver Integration (TDDI) method, touch signal lines are embedded into a TFT (Thin Film Transistor) array, which can realize time-sharing display and touch function, and reduce the thickness of the touch screen. This can improve portability and can satisfy user demands for mobile touch display devices.

SUMMARY

At least one embodiment of the present disclosure provides an array substrate, including: a plurality of touch units arranged in an array and insulated from each other, each of the plurality of touch units including at least one electrode block arranged in an array and connected to each other; and a plurality of touch lines; wherein the touch units and the touch lines are connected in a one-to-one correspondence with each other by direct overlap.

In an embodiment of the present disclosure, all the electrode blocks of the plurality of touch units receive a common voltage from the plurality of touch lines for display within a first time period, and receive a touch voltage from the plurality of touch lines within a second time period, to detect a change in capacitance of the plurality of touch lines, and determine a touch position.

In an embodiment, the array substrate further includes: a base substrate, a thin film transistor, a passivation protection layer, a pixel electrode, and an insulating protection layer. The thin film transistor is disposed on the base substrate, the passivation protection layer is disposed on the thin film transistor, the pixel electrode is disposed on the passivation protection layer, the insulating protection layer is disposed on the pixel electrode, and all electrode blocks of the plurality of touch control units are disposed on the insulating protection layer.

In an embodiment of the present disclosure, the thin film transistor includes a gate electrode, a gate insulating layer, an active layer, a source electrode and a drain electrode. The gate electrode is disposed on the base substrate, the gate insulating layer is disposed on the gate electrode, the active layer is on the gate insulating layer, and the source and drain electrodes are disposed on the active layer.

In an embodiment of the present disclosure, the array substrate further includes a data line, and the data line is disposed on the active layer in the same layer as the source electrode and the drain electrode.

In an embodiment, one of the touch lines is provided on each of two sides of the same data line, and the touch line is opaque.

In an embodiment, the electrode block includes slits arranged side by side, and extending directions of the slits are parallel to an extending direction of the data line.

In an embodiment, one of the touch units includes at least two electrode blocks, and the array substrate further includes a connecting line in the same layer as the gate electrode, and the at least two electrode blocks are respectively connected to the connecting line through one via hole.

In an embodiment, the insulating protection layer has a thickness of 0.8 to 2.5 microns.

At least one embodiment of the present disclosure provides a touch display panel including the above-mentioned array substrate, a counter substrate and a liquid crystal layer, the liquid crystal layer being disposed between the array substrate and the counter substrate.

At least one embodiment of the present disclosure provides a method for manufacturing the above-mentioned array substrate, and the method includes:

forming a first transparent conductive layer, a metal layer, and a first photoresist layer, wherein the metal layer is disposed on the first transparent conductive layer, and the first photoresist layer is disposed on the metal layer;

placing a first halftone mask on the first photoresist layer, and exposing and developing the first photoresist layer to obtain a second photoresist layer including a hollowed portion, a first blocking portion and a second blocking portion, the first blocking portion having a thickness larger than a thickness of the second blocking portion;

etching the metal layer disposed under the hollowed portion to expose the first transparent conductive layer under the hollowed portion;

etching the exposed first transparent conductive layer to obtain electrode blocks arranged in an array;

ashing the first blocking portion and the second blocking portion, and removing the second blocking portion, wherein the first blocking portion is ashed to obtain a third blocking portion, the third blocking portion having a thickness smaller than that of the first blocking portion; and etching the metal layer that is not covered by the third blocking portion and removing the third blocking portion to obtain a touch line.

According to the above-mentioned embodiments, it is apparent that since the touch units are connected to the touch lines by direct overlap, the load of the pixel structure can be reduced, which is beneficial to realize a large-size touch screen.

It is to be understood that the above general descriptions and the below detailed descriptions are merely exemplary and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Embodiments will be described in detail herein, with the illustrations thereof represented in the drawings. When the following descriptions involve the drawings, like numerals in different drawings refer to like or similar elements unless otherwise indicated. The implements described in the following embodiments do not represent all implements consistent with the present disclosure. Rather, they are merely examples of apparatuses and methods consistent with some aspects of the present disclosure as detailed in the appended claims.

Since the pixel structure of the ADS (Advanced Super Dimensional Switching) type liquid crystal display panel has a higher load than the pixel structure of the IPS type, TN (Twist Nematic) type liquid crystal display panel, etc., it is difficult to solve the pixel charging and the attenuation of touch signals, which restricts the ADS pixel structure based Incell technology, and especially the development of large-size and super-large display devices that use Incell technology. Incell touch technology has been mainly employing the IPS (In Plane Switch, lateral electric field effect) pixel structure for all the time.

Figure 1:
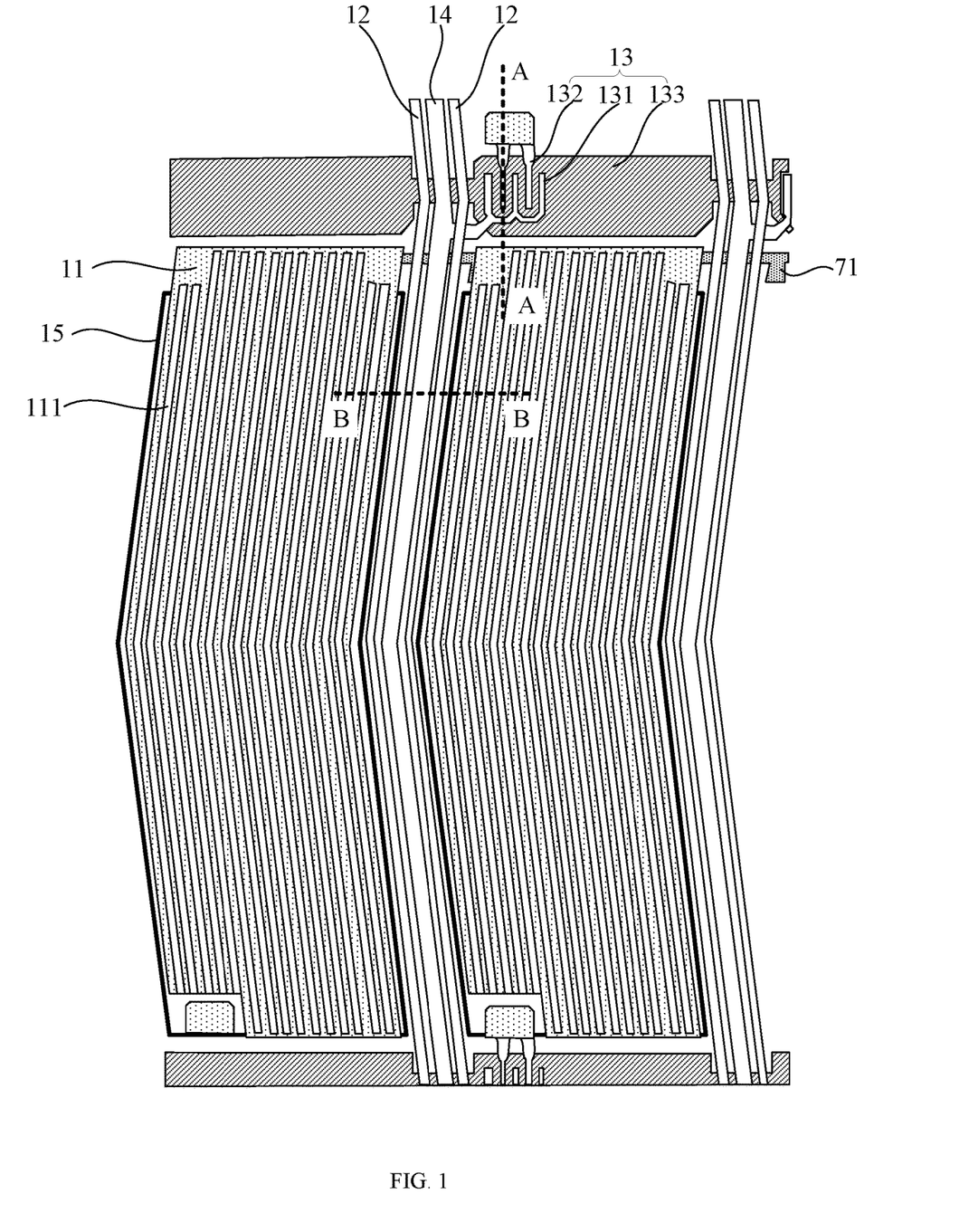
FIG. 1 is a schematic structural diagram of an array substrate according to an embodiment of the present disclosure.
Figure 2:
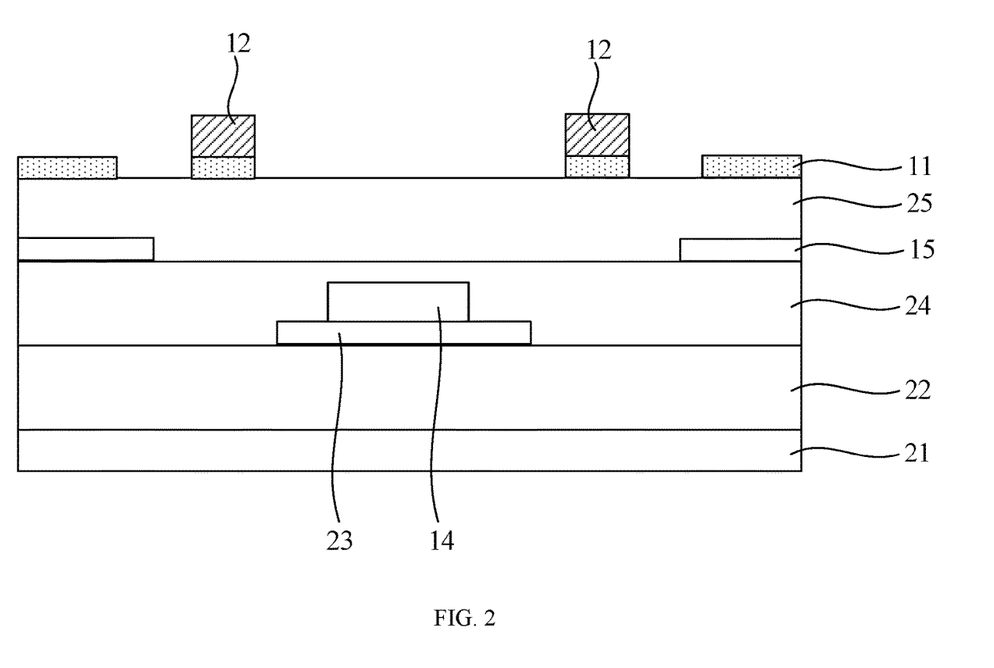
FIG. 2 is a schematic structural diagram of an array substrate according to another embodiment of the present disclosure.
Figure 3:
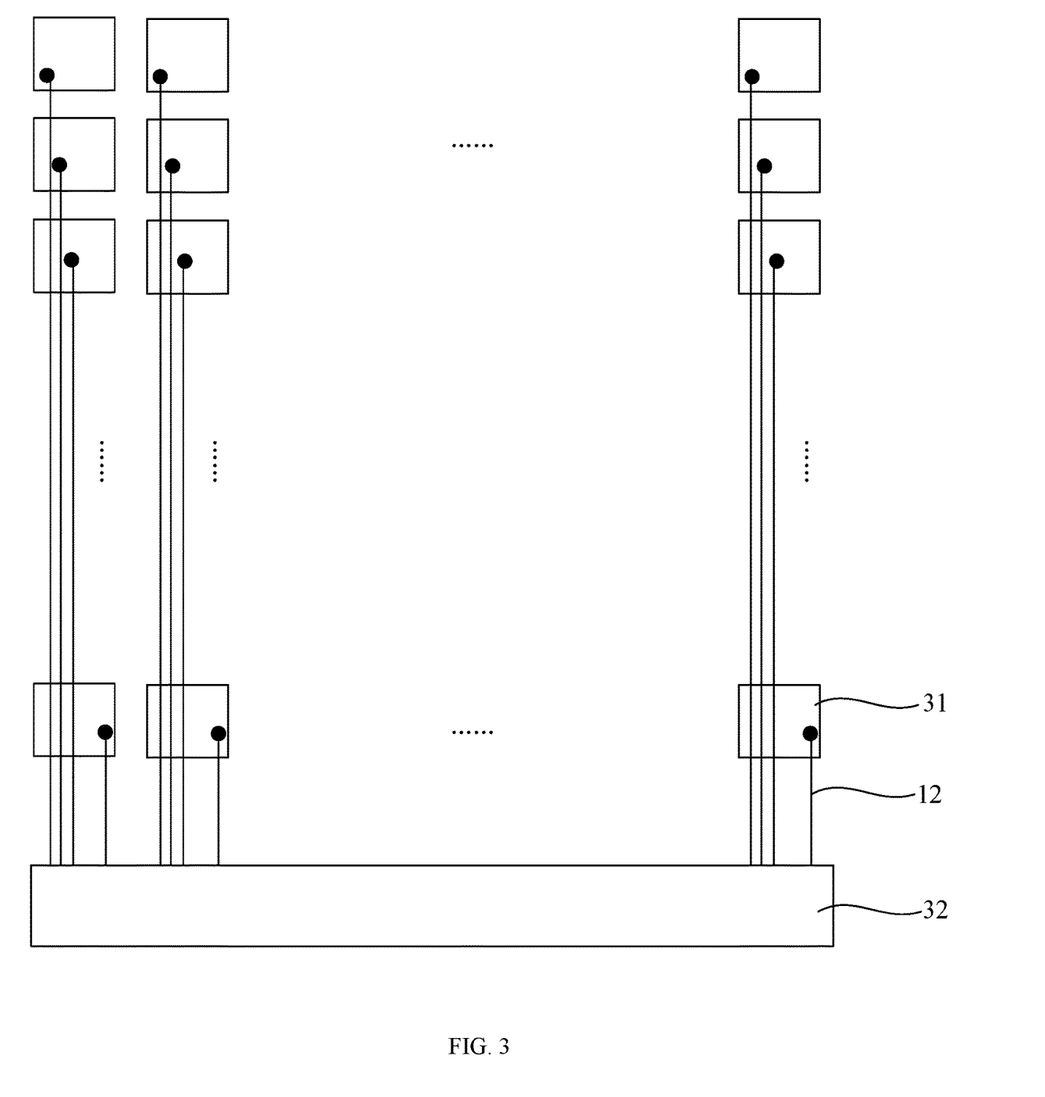
FIG. 3 is a schematic structural diagram of an array substrate according to another embodiment of the present disclosure.
Figure 4:
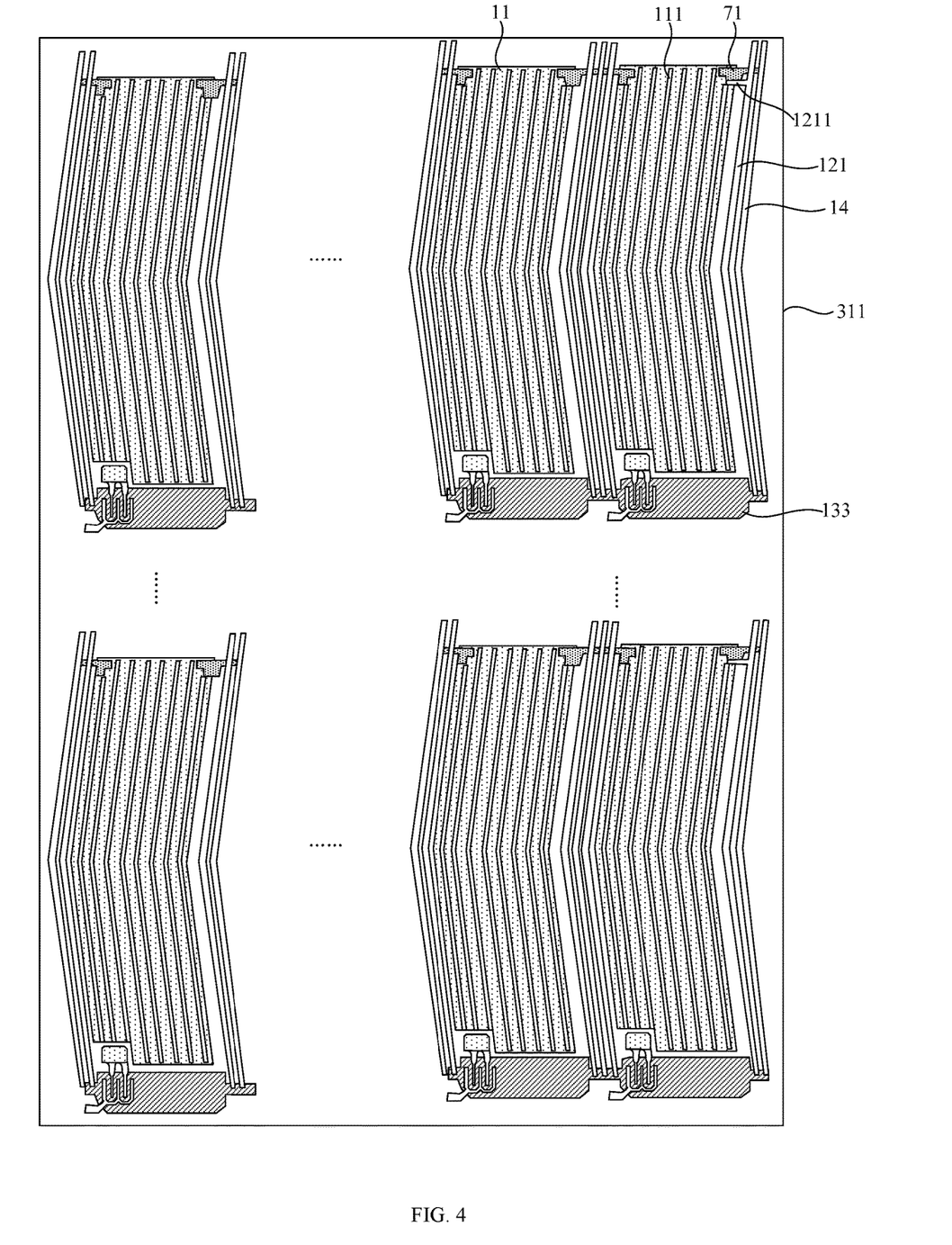
FIG. 4 is a schematic structural diagram of an array substrate according to still another embodiment of the present disclosure.
Figure 5:
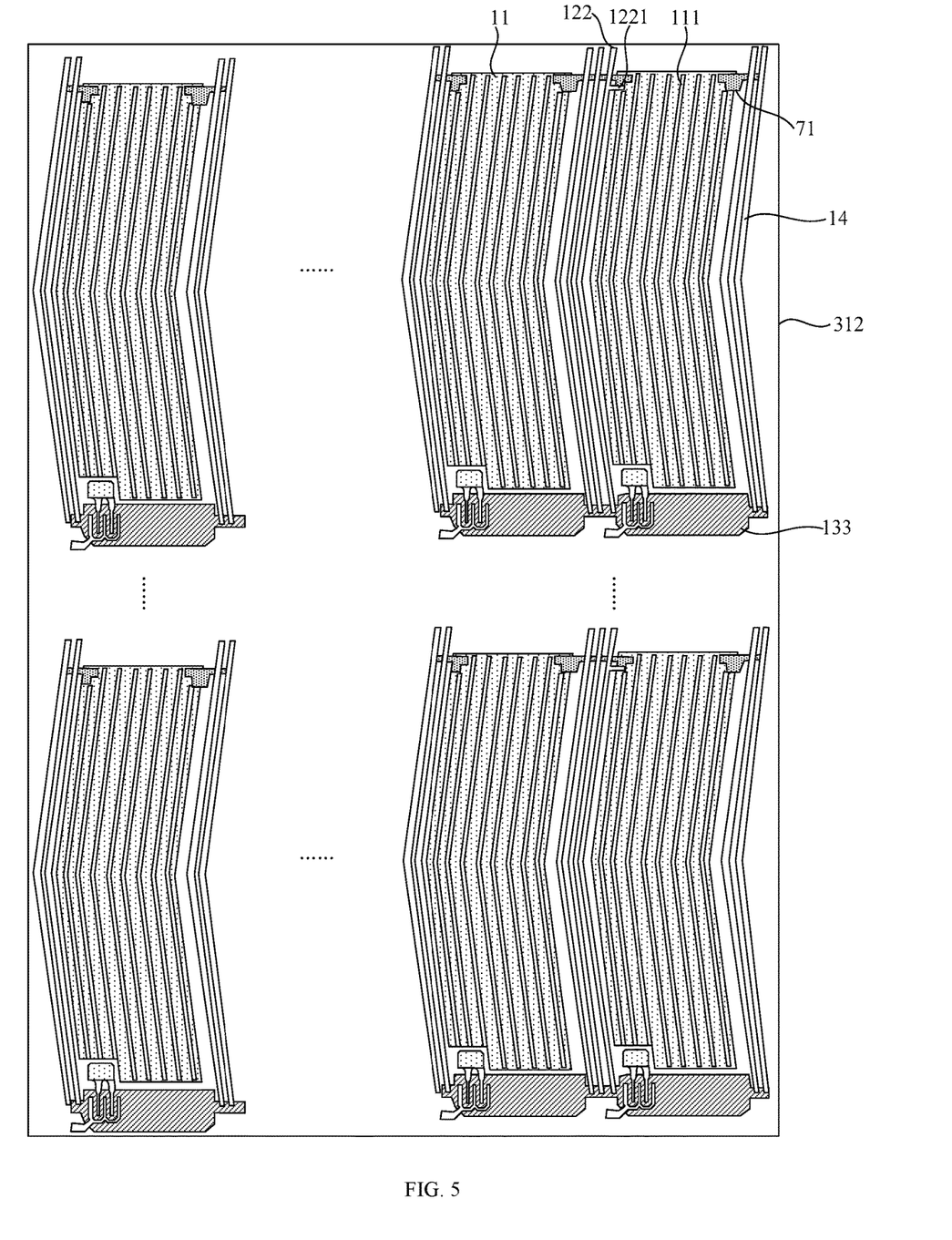
FIG. 5 is a schematic structural diagram of an array substrate according to an embodiment of the present disclosure.
Figure 6:
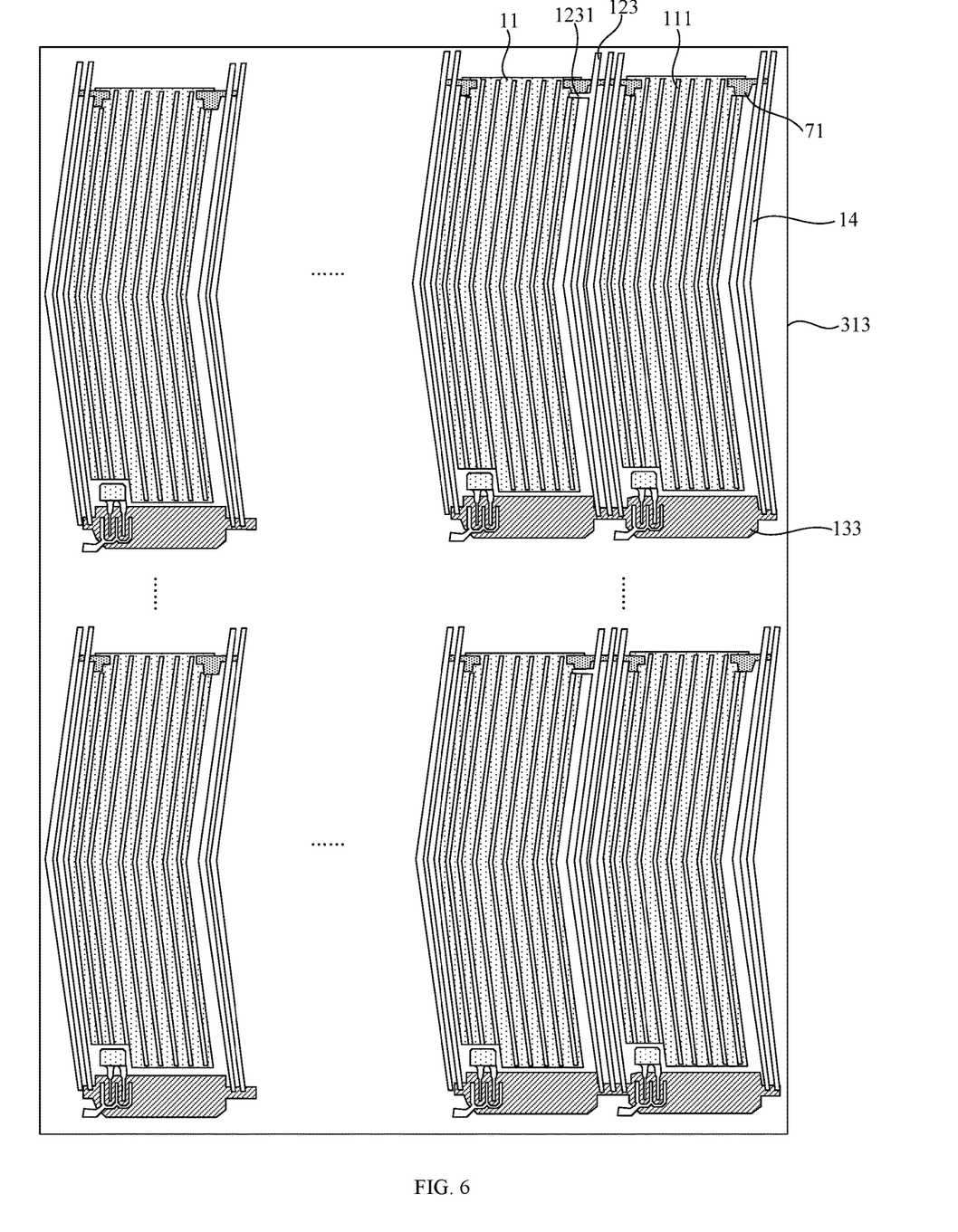
FIG. 6 is a schematic structural diagram of an array substrate according to another embodiment of the present disclosure.

As shown in FIGS. 1 to 6, an embodiment of the present disclosure provides an array substrate. FIG. 2 is a cross-sectional view of FIG. 1 along a section line BB. As shown in FIG. 3, the array substrate includes a plurality of touch units 31 and a plurality of touch lines 12 arranged in an array and insulated from each other. As shown in FIGS. 4 to 6, each of the plurality of touch control units 31 includes at least one electrode block 11 arranged in an array and connected to each other, and each of the touch control units 31 is connected by direct overlap to a corresponding touch line 12.

In the embodiments of the present disclosure, since the touch units are connected to the touch lines by direct overlap, the load of the pixel structure can be reduced, which is beneficial to realize a large-size touch screen.

The array substrate in the embodiments of the present disclosure has been briefly introduced above. The array substrate in the embodiments of the present disclosure will be described in detail below.

Another embodiment of the present disclosure also provides an array substrate. In this embodiment, as shown in FIG. 3, the array substrate includes a plurality of touch units 31 arranged in an array.

Each of the plurality of touch control units 31 can have the structure as the first touch control unit 311 shown in FIG. 4, the second touch control unit 312 shown in FIG. 5, or the third touch control unit 313 shown in FIG. The first touch unit 311, the second touch unit 312, and the third touch unit 313 can be disposed in the same column, but are not limited thereto.

As shown in FIG. 4, the first touch unit 311 includes at least one electrode block 11, and all the electrode blocks 11 in the first touch unit 311 are electrically connected. The touch line 12 includes a first touch line 121, and the first touch line 121 is connected to the first touch unit 311 by direct overlap. The first touch line 121 includes a first connecting portion 1211, and the first connecting portion 1211 is connected to the first touch unit 311 by direct overlap.

As shown in FIG. 5, the second touch unit 312 includes at least one electrode block 11, and all the electrode blocks 11 in the second touch unit 312 are electrically connected. The touch line 12 includes a second touch line 122, and the second touch line 122 is connected to the second touch unit 312 by direct overlap. The second touch line 122 includes a second connecting portion 1221, and the second connecting portion 1221 is connected to the second touch control unit 312 by direct overlap.

As shown in FIG. 6, the third touch unit 313 includes at least one electrode block 11, and all the electrode blocks 11 in the third touch unit 313 are electrically connected. The touch line 12 includes a third touch line 123, and the third touch line 123 is connected to the third touch unit 313 by direct overlap. The third touch line 123 includes a third connecting portion 1231, and the third connecting portion 1231 is connected to the third touch unit 313 by direct overlap.

Figure 7:
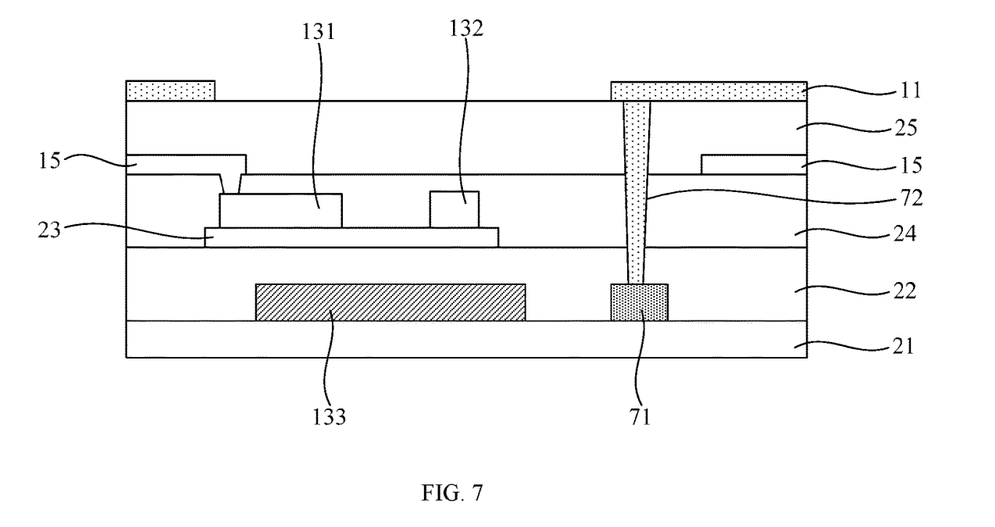
FIG. 7 is a schematic structural diagram of an array substrate according to another embodiment of the present disclosure.

As shown in FIG. 7, in the case where the touch unit 31 includes at least two electrode blocks 11, the array substrate further includes a connecting line 71, and the at least two electrode blocks 11 are respectively connected to the same connecting line 71 through a via hole 72. In this way, the at least two electrode blocks 11 in the same touch unit 31 can be electrically connected. Here, FIG. 7 is a cross-sectional view of FIG. 1 along the section line AA.

In the embodiments of the present disclosure, since the touch units are connected to the touch lines by direct overlap, the load of the pixel structure can be reduced, which is beneficial to realize a large-size touch screen.

In an embodiment of the present disclosure, as shown in FIG. 1, the array substrate further includes a thin film transistor 13, a data line 14, and a pixel electrode 15.

As shown in FIG. 1, the thin film transistor 13 includes a source electrode 131, a drain electrode 132, and a gate electrode 133. Here, the positions of the source electrode 131 and the drain electrode 132 are interchangeable. The source electrode 131 or the drain electrode 132 is connected to the data line 14. A touch line 12 is provided on each of the two sides of the same data line 14. The touch line 12 can be made of opaque metal. Since the touch line 12 is opaque, it can effectively shield the light leakage from the side direction, so that the BM (black matrix) can be provided narrower, and the aperture area of the pixels can be increased, thereby improving the light utilization efficiency.

As shown in FIG. 1, each electrode block 11 includes slits 111 arranged side by side, and the extending directions of the slits 111 are parallel to the extending direction of the data line 14.

In an embodiment of the present disclosure, the array substrate further includes a pixel electrode 15. As shown in FIG. 1 and FIG. 2, the pixel electrode 15 is arranged opposite to the electrode block 11. The pixel electrode 15 is made of a transparent conductive material, for example, ITO (Indium Tin Oxide), but is not limited thereto. In an embodiment of the present disclosure, the pixel electrode 15 and the gate electrode 133 are not in the same layer, as shown in FIG. 7.

In an embodiment of the present disclosure, the array substrate further includes a touch control chip and a display chip. The touch control chip and the display chip can be separately provided as discrete devices, or the touch control chip and the display chip can be integrated into a touch display chip 32, as shown in FIG. 3. In the case where the touch control chip and the display chip are provided as separate devices, the touch control unit 31 is connected to the touch control chip and the display chip through the touch line 12 and then through a signal multiplexer, respectively. When the touch control chip and the display chip are integrated into the touch display chip 32, the touch unit 31 is connected to the touch display chip 32 through the touch line 12. Hereinafter, the working principle of the array substrate will be described by taking the integration of the touch control chip and the display chip into the touch display chip 32 as an example.

In an embodiment of the present disclosure, the touch display chip 32 is configured to provide a common voltage to each touch unit 31 through the touch line 12 in a first time period (i.e., display period). Since each touch line 12 is electrically connected to the touch display chip 32, and all the electrode blocks 11 in each touch unit 31 are electrically connected, all the electrode blocks 11 on the array substrate are electrically connected, and all the electrode blocks 11 are applied with a common voltage. In this case, all the electrode blocks of all touch units 31 are configured as a common electrode, which cooperates with the pixel electrode 15 to achieve a display function. The touch display chip 32 is configured to provide a touch voltage to the touch unit 31 through the touch line 12 in a second time period (i.e., touch detection period), and detect a change in capacitance of the touch unit 31 to identify the touch location. In the first time period, the touch line receives the common voltage, which can prevent the electric field at the position of the touch line from being disturbed, reduce interference, and fully improve the signal-to-noise ratio of the touch.

Figure 8:
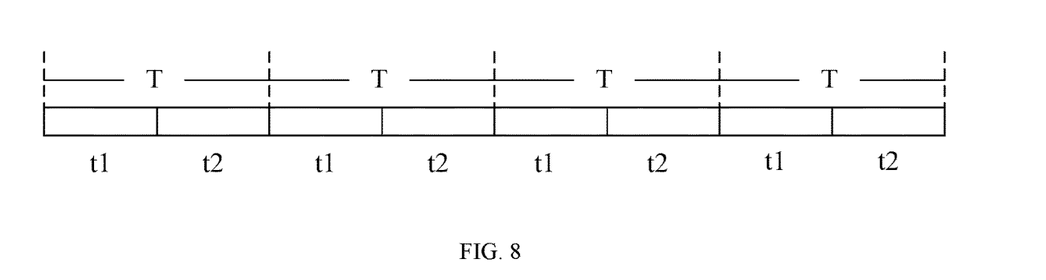
FIG. 8 is a schematic time sequence diagram of touch control according to an embodiment of the present disclosure.

As shown in FIG. 8, in one frame period T, the touch display chip 32 is configured to provide a common voltage to the common electrode through the touch line 12 in the first time period t1 (i.e., display period) to achieve the display function, and provide a touch voltage to the touch unit 31 through the touch line 12 in the second time period t2 (that is, the touch detection time period) to detect the touch position.

In the related art, the vertical Slit (slit) design of the ADS pixel has the problem of vertical light leakage, so that although the ADS pixel structure in the related art can achieve high transmittance, it is still difficult to use it on a large scale. In the pixel structure of the embodiment, the signal loaded by the touch line during the display period is a common voltage signal. On the one hand, the electric field at this position will not be disturbed. On the other hand, since the touch line is opaque, it can effectively shield the light leakage from the side directions, so that the BM can be provided narrower, and the aperture area of the pixels can be increased, thereby achieving high light efficiency.

Another embodiment of the present disclosure also provides an array substrate. In this embodiment, as shown in FIGS. 2 and 7, the array substrate further includes a base substrate 21, a thin film transistor 13 disposed on the base substrate 21, and a passivation protection layer 24 disposed on the thin film transistor 13. The pixel electrode 15 is disposed on the passivation protection layer 24, an insulating protection layer 25 is disposed on the pixel electrode 15, and the electrode block of the touch unit 31 is disposed on the insulating protection layer 25.

In an embodiment of the present disclosure, the insulating protection layer has a thickness of 0.8 micrometers. Thus, the load capacitances between the touch line and the gate electrode, the data line, and the pixel electrode can be effectively reduced. In another embodiment, the thickness of the insulating protection layer can be 1.65 microns. In yet another embodiment, the thickness of the insulating protection layer can be 2.5 microns.

In an embodiment of the present disclosure, the material of the insulating protection layer can be made of an organic material.

As shown in FIG. 7, in an embodiment of the present disclosure, the gate electrode 133 is disposed on the base substrate 21, and the connecting wire 71 is also disposed on the base substrate 21, and is on the same layer as the gate electrode 133. The connecting wire 71 and the gate electrode 133 can be made of the same material and can be manufactured in the same process.

As shown in FIG. 7, in an embodiment of the present disclosure, the thin film transistor 13 further includes a gate insulating layer 22, and the gate insulating layer 22 is disposed on the gate electrode 133. The via hole 72 penetrates the insulating protection layer 25, the passivation protection layer 24 and the gate insulating layer 22.

As shown in FIG. 7, in an embodiment of the present disclosure, the thin film transistor 13 further includes an active layer 23, and the active layer 23 is disposed on the gate insulating layer 22. The source electrode 131 and the drain electrode 132 are disposed on the active layer 23, and the passivation protection layer 24 is disposed on the source electrode 131 and the drain electrode 132.

As shown in FIG. 2, in an embodiment of the present disclosure, the data line 14 is disposed on the active layer 23, and the data line 14 is in the same layer as the source electrode 131 and the drain electrode 132. In an embodiment of the present disclosure, in order to reduce the resistance of the data line, an active layer 23 is provided in a region outside the thin film transistor 13, and the data line 14 is disposed on the active layer 23. The data line 14 and the active layer 23 can be manufactured with a half-tone mask (HTM), and the manufacturing process will not be described in detail here. It should be noted that the active layer 23 can be omitted under the data line 14. When the active layer 23 does not exist under the data line 14, the data line 14 and the active layer 23 can be manufactured separately with a mask.

In this embodiment, since the electrode block (i.e., the common electrode) of the touch unit and the pixel electrode are disposed above the thin film transistor, the parasitic capacitance between the common electrode, the pixel electrode and the thin film transistor can be reduced, and thus reducing the pixel load, which is beneficial to the realization of a large-size touch screen.

The embodiments of the present disclosure also provide a touch display panel, including the array substrate described in any of the above embodiments, a counter substrate, and a liquid crystal layer, and the liquid crystal layer is disposed between the array substrate and the counter substrate.

In this embodiment, since the touch units are connected to the touch lines by direct overlap, the load of the pixel structure can be reduced, which is beneficial to realize a large-size touch screen.

In the embodiment of the present disclosure, the touch display panel is a self-capacitive TDDI (Touch and Display Driver Integration) touch display panel, that is, the touch function and the display function are all under control of the above touch display chip.

In the embodiment of the present disclosure, the touch display panel is an ADS (Advanced Super Dimensional Field Switch) type touch display panel.

In the embodiment of the present disclosure, the touch display panel is an in-cell touch display panel (In Cell Touch Panel).

In the embodiments of the present disclosure, a touch display panel with an IPS pixel structure can effectively improve light efficiency, while interference can be reduced more, and the signal-to-noise ratio of touch can be fully improved.

Figure 9:
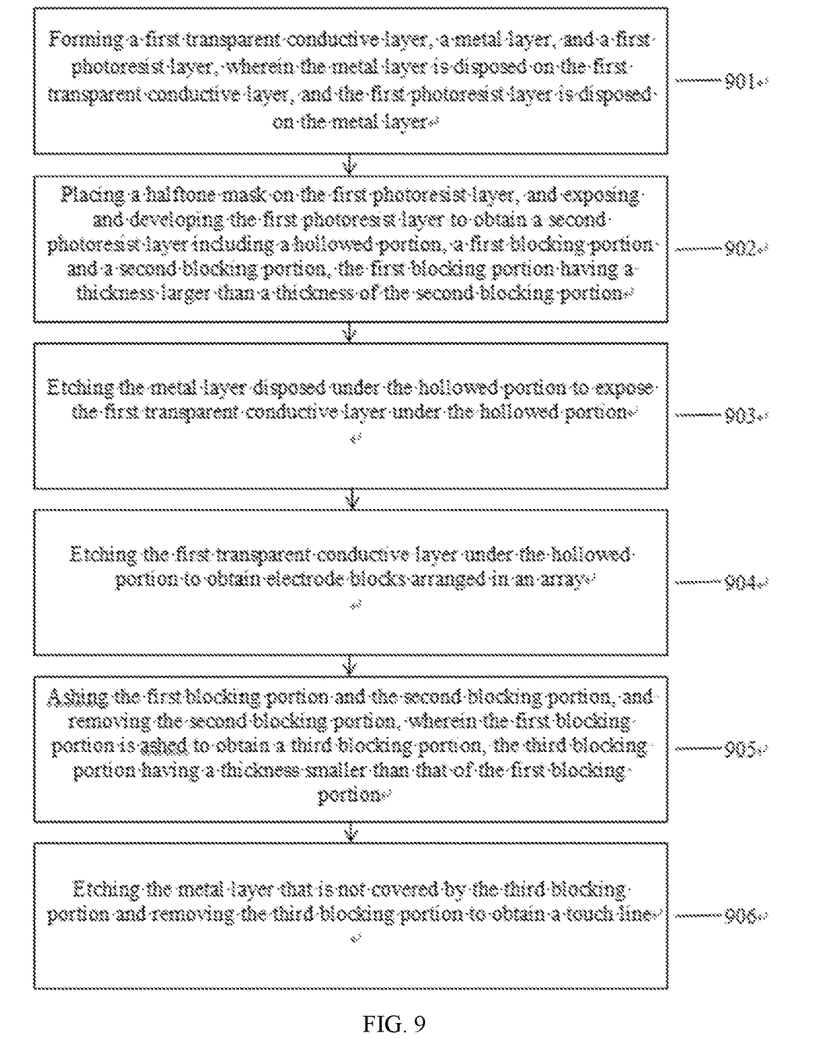
FIG. 9 is a schematic flowchart of a method for manufacturing an array substrate according to an embodiment of the present disclosure.

The embodiments of the present disclosure also provide a method for manufacturing an array substrate, which is used to manufacture the array substrate described in any of the above embodiments. As shown in FIG. 9, the method for manufacturing the array substrate includes the following steps 901 to 907.

In step 901, a first transparent conductive layer, a metal layer and a first photoresist layer are formed, wherein the metal layer is disposed on the first transparent conductive layer, and the first photoresist layer is disposed on the metal layer.

Figure 10:
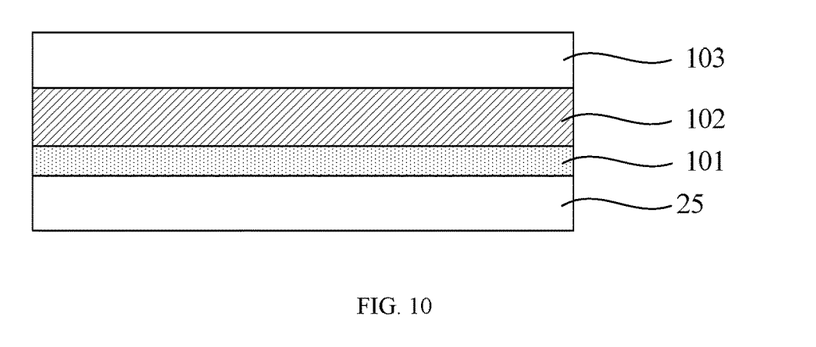
FIGS. 10-17 are schematic structural diagrams of intermediate structures generated during the manufacturing process of the array substrate according to an embodiment of the present disclosure.

In this embodiment, as shown in FIG. 10, a first transparent conductive layer 101, a metal layer 102, and a first photoresist layer 103 can be sequentially formed on the insulating protection layer 25. The material of the first transparent conductive layer 101 can be ITO (Indium Tin Oxide), but is not limited thereto. The material of the metal layer 102 is an opaque metal. The material of the first photoresist layer can be a negative photoresist.

In step 902, a first halftone mask is placed on the first photoresist layer, and the first photoresist layer is exposed and developed to obtain a second photoresist layer. The second photoresist layer includes a hollowed portion, a first blocking portion and a second blocking portion, and the thickness of the first blocking portion is larger than the thickness of the second blocking portion.

Figure 11:
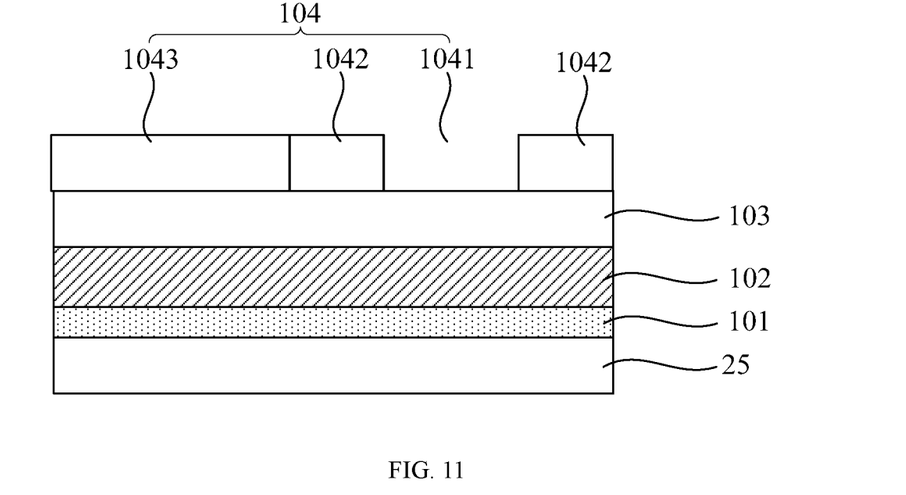

In an embodiment of the present disclosure, as shown in FIG. 11, the first halftone mask 104 is placed on the first photoresist layer 103. The first halftone mask 14 includes a light-transmitting portion 1041, a light-shielding portion 1042, and a partial light-transmitting portion 1043. The light transmittance of the partial light-transmitting portion 1043 is larger than 0 and less than the light transmittance of the light-transmitting portion 1041.

In an embodiment of the present disclosure, the light transmittance of the light transmitting portion 1041 can be 100%, the light transmittance of the partial light transmitting portion 1043 can be 50%, and the light transmittance of the light-shielding portion 1042 can be 0, but it is not limited to this. For example, in another embodiment of the present disclosure, the light transmittance of the light-transmitting portion 1041 can be 95%, the light transmittance of the partial light-transmitting portion 1043 can be 55%, and the light transmittance of the light-shielding portion 1042 can be 5%.

In this step, the first halftone mask can be irradiated with light, and the first photoresist layer exposed to the light will be denatured, where the degree of denaturation of the first photoresist layer is different due to the amount of exposure received In this embodiment, the degree of denaturation of the first photoresist layer under the light-transmitting portion 1041 is the greatest, the degree of denaturation of the first photoresist layer under the partial light-transmitting portion 1043 is less than that of the first photoresist layer under the light-transmitting portion 1041, and the degree of denaturation of the first photoresist layer under the light-shielding portion 1042 is smaller than the degree of denaturation of the first photoresist layer under the partial light-transmitting portion 1043.

Figure 12:
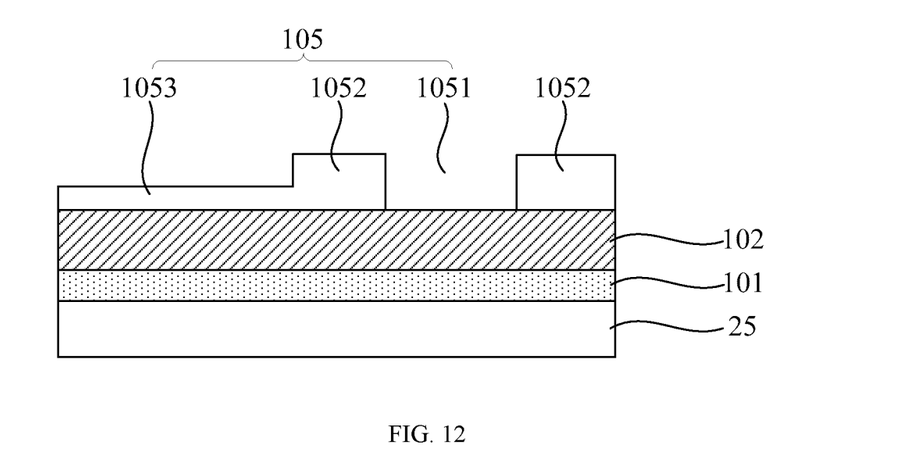

In this step, as shown in FIG. 12, the exposed first photoresist layer is developed to obtain a second photoresist layer 105. The second photoresist layer 105 includes a hollowed portion 1051, a first blocking portion 1052, and a second blocking portion 1053. The first blocking portion 1052 has a thickness larger than the thickness of the second blocking portion 1053.

In step 903, the metal layer disposed under the hollowed portion is etched to expose the first transparent conductive layer under the hollowed portion.

Figure 13:
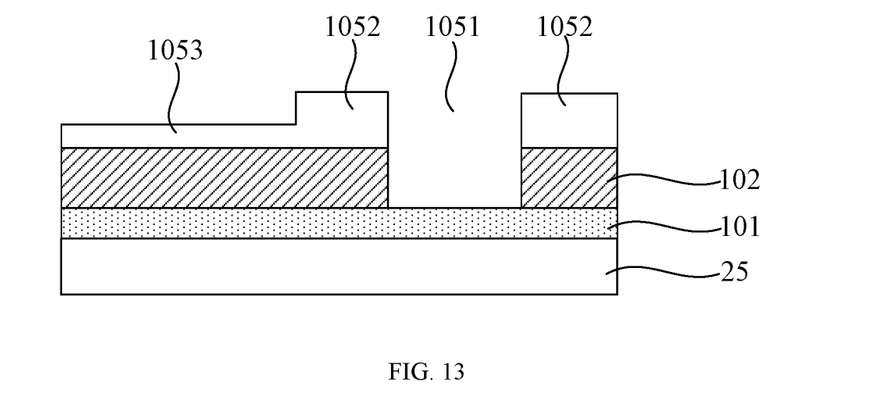

In this embodiment, as shown in FIG. 13, the metal layer 102 disposed under the hollowed portion 1051 is etched to expose the first transparent conductive layer 101 under the hollowed portion 1051.

In step 904, the first transparent conductive layer under the hollowed portion is etched to obtain electrode blocks arranged in an array.

Figure 14:
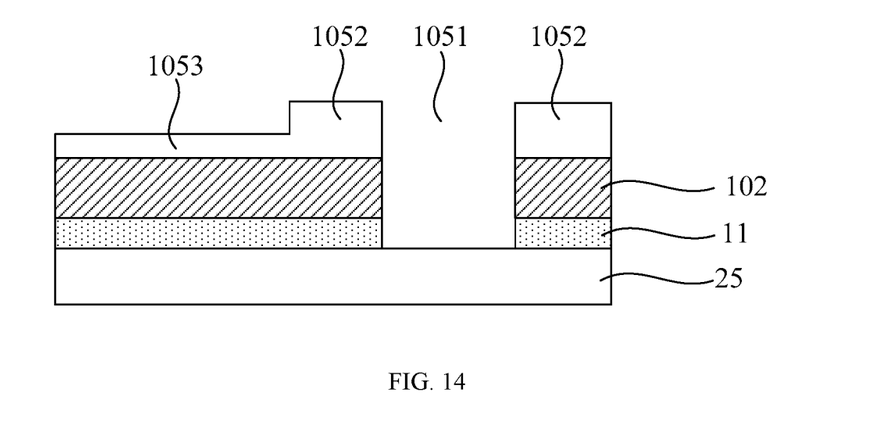

In this embodiment, as shown in FIG. 14, the first transparent conductive layer 101 under the hollowed portion 1051 is etched to obtain the electrode blocks 11 arranged in an array.

In step 905, the first blocking portion and the second blocking portion are ashed, and the second blocking portion is removed. A third blocking portion is obtained after the first blocking portion is ashed, and the thickness of the third blocking portion is less than the first blocking portion.

Figure 15:
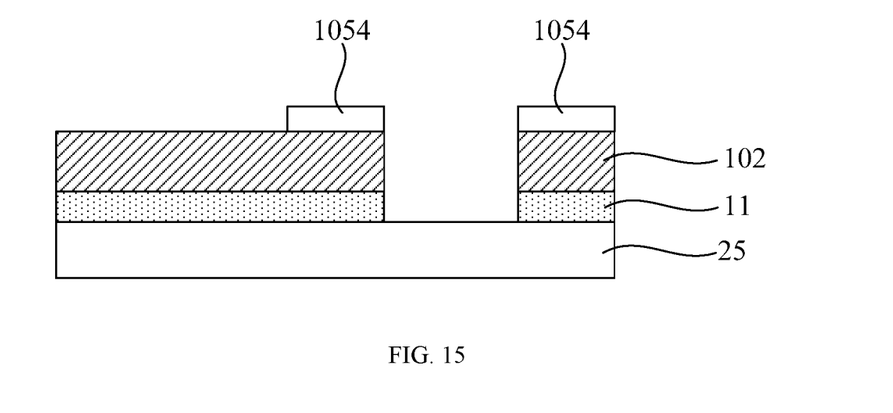

In this step, as shown in FIG. 15, the first blocking portion 1052 and the second blocking portion 1053 are ashed, and the second blocking portion 1053 is removed. Since the thickness of the first blocking portion 1052 is larger than the thickness of the second blocking portion 1053, when the second blocking portion 1053 is removed, the first blocking portion 1052 is not completely removed, but the thickness is reduced. A third blocking portion 1054 is obtained after the first blocking portion is ashed, and the thickness of the third blocking portion 1054 is smaller than that of the first blocking portion 1052.

In step 906, the metal layer not covered by the third blocking portion is etched, and the third blocking portion is removed to obtain a touch line.

Figure 16:
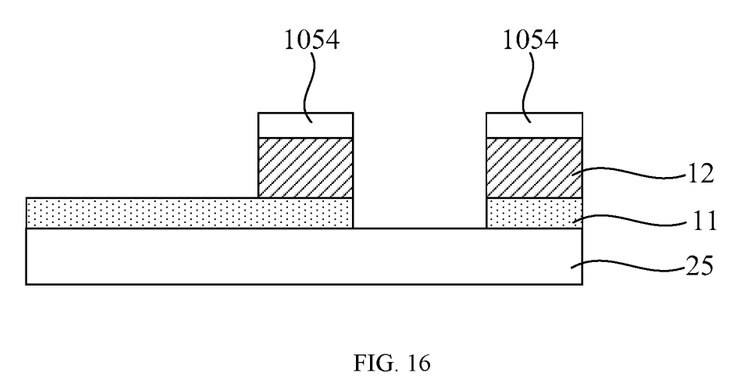
Figure 17:
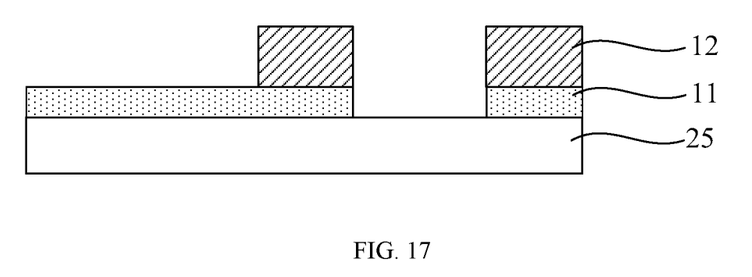

In this embodiment, as shown in FIG. 16, the metal layer 102 that is not covered by the third blocking portion 1054 is etched to obtain the touch line 12. As shown in FIG. 17, removing the third blocking portion 1054 can expose the touch line 12 to obtain the array substrate in the above-mentioned embodiment.

In this embodiment, since the touch units are connected to the touch line by direct overlap, the load of the pixel structure can be reduced, which is beneficial to realize a large-size touch screen.

It should be noted that the above-mentioned touch display panel can be applied to a display device. The display device in the embodiment of the present disclosure can be any product or component with display function, such as electronic paper, a mobile phone, a tablet computer, television, a notebook computer, a digital photo frame, a navigator or the like.

The fabricating process used in the above process can include, for example, a film forming process such as deposition and sputtering, and a patterning process such as etching.

It should be noted that in the drawings, the sizes of layers and regions can be exaggerated for clarity of illustration. It will also be understood that when an element or layer is referred to as being "on" another element or layer, it can be directly on the other element or intervening layers can be present. In addition, it will be understood that when an element or layer is referred to as being "under" another element or layer, it can be directly under the other element, or there can be more than one intervening layer or element. In addition, it can also be understood that when a layer or element is referred to as being "between" two layers or two elements, it can be the only layer between the two layers or two elements, or more than one intervening layer or element can also be present. Similar reference numerals indicate similar elements throughout.

In the present disclosure, the terms "first" and "second" are only used for descriptive purposes, and cannot be understood as indicating or implying relative importance. The term "plurality" refers to two or more, unless specifically defined otherwise.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

What is claimed is:

1. An array substrate comprising:
    a plurality of touch units arranged in an array and insulated from each other, each of the plurality of touch units comprising at least one electrode block arranged in an array and connected to each other;
    a plurality of touch lines; and
    a plurality of data lines,
    wherein the touch units and the touch lines are connected in a one-to-one correspondence with each other by direct contact;
    wherein the electrode blocks and the touch lines contact directly without an intermediate layer therebetween,
    wherein a pair of the touch lines is provided on both sides of a corresponding one of the data lines and the pair of the touch lines are insulated from each other;
    wherein the touch lines are opaque;
    wherein any two of the touch lines are insulated from each other.

2. The array substrate according to claim 1, wherein all the electrode blocks of the plurality of touch units receive a common voltage from the plurality of touch lines for display within a first time, and receive a touch voltage from the plurality of touch lines within a second time, to detect a change in capacitance of the plurality of touch lines, and determine a touch position.

3. The array substrate according to claim 2, further comprising:
    a base substrate;
    a thin film transistor disposed on the base substrate;
    a passivation protection layer disposed on the thin film transistor;
    a pixel electrode disposed on the passivation protection layer; and
    an insulating protection layer disposed on the pixel electrode;
    wherein the at least one electrode block of the plurality of touch units is disposed on the insulating protection layer.

4. The array substrate according to claim 1, further comprising:
    a base substrate;
    a thin film transistor disposed on the base substrate;
    a passivation protection layer disposed on the thin film transistor;
    a pixel electrode disposed on the passivation protection layer; and
    an insulating protection layer disposed on the pixel electrode;
    wherein the at least one electrode block of the plurality of touch units is disposed on the insulating protection layer.

5. The array substrate according to claim 4, wherein the thin film transistor comprises:
    a gate electrode disposed on the base substrate;
    a gate insulating layer disposed on the gate electrode;
    an active layer disposed on the gate insulating layer; and
    a source electrode and a drain electrode, disposed on the active layer.

6. The array substrate according to claim 5, wherein the data lines are in the same layer as the source electrode and the drain electrode.

7. The array substrate according to claim 6, wherein the electrode blocks comprise slits arranged side by side, and extending directions of the slits are parallel to an extending direction of the data lines.

8. The array substrate according to claim 7, wherein one of the touch units comprises at least two electrode blocks, and the array substrate further comprises a connecting line in the same layer as the gate electrode, and the at least two electrode blocks are respectively connected to the connecting line through a via hole.

9. The array substrate according to claim 6, wherein one of the touch units comprises at least two electrode blocks, and the array substrate further comprises a connecting line in the same layer as the gate electrode, and the at least two electrode blocks are respectively connected to the connecting line through a via hole.

10. The array substrate according to claim 4, wherein the insulating protection layer has a thickness of 0.8 to 2.5 microns.

11. A touch display panel comprising the array substrate according to claim 1, a counter substrate and a liquid crystal layer, the liquid crystal layer being disposed between the array substrate and the counter substrate.

12. A method for manufacturing the array substrate according to claim 1, comprising:
forming a first transparent conductive layer, a metal layer, and a first photoresist layer, wherein the metal layer is disposed on the first transparent conductive layer, and the first photoresist layer is disposed on the metal layer;
placing a first halftone mask on the first photoresist layer, and exposing and developing the first photoresist layer to obtain a second photoresist layer comprising a hollowed portion, a first blocking portion and a second blocking portion, the first blocking portion having a thickness larger than a thickness of the second blocking portion;
etching the metal layer disposed under the hollowed portion to expose the first transparent conductive layer under the hollowed portion;
etching the first transparent conductive layer under the hollowed portion to obtain electrode blocks arranged in an array;
ashing the first blocking portion and the second blocking portion, and removing the second blocking portion, wherein the first blocking portion is ashed to obtain a third blocking portion; and
etching the metal layer that is not covered by the third blocking portion to obtain touch lines,
wherein the array substrate comprises a plurality of data lines,
wherein the touch units and the touch lines are connected in a one-to-one correspondence with each other by direct contact;
wherein the electrode blocks and the touch lines contact directly without an intermediate layer therebetween,
wherein a pair of the touch lines is provided on both sides of a corresponding one of the data lines, and the pair of the touch lines are insulated from each other;
wherein the touch lines are opaque;
wherein any two of the touch lines are insulated from each other.

13. The array substrate according to claim 1, wherein the electrode blocks comprise slits arranged side by side, and extending directions of the slits are parallel to an extending direction of the data lines.

14. The array substrate according to claim 1, wherein one of the touch units comprises at least two electrode blocks, and the array substrate further comprises a connecting line in the same layer as the gate electrode, and the at least two electrode blocks are respectively connected to the connecting line through a via hole.

* * * * *